March 30, 1926.  1,579,098
A. H. R. FEDDEN
CONSTRUCTION OF JOINT COMPRISING MEMBERS OF DIFFERENT THERMAL EXPANSIONS
Filed Sept. 30, 1925
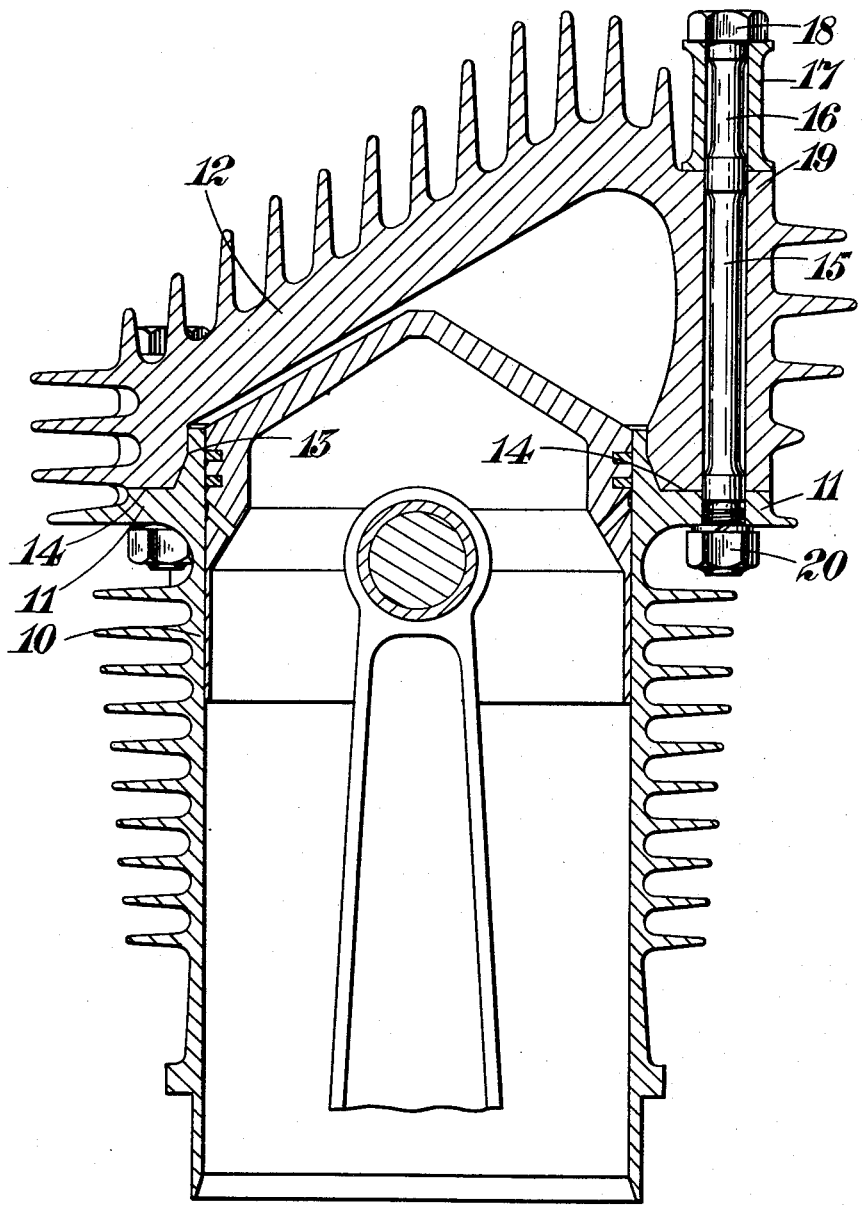
Inventor
Alfred H. R. Fedden
by Wilkinson & Giusta
Attorneys.

Patented Mar. 30, 1926.

1,579,098

UNITED STATES PATENT OFFICE.

ALFRED HUBERT ROY FEDDEN, OF BRISTOL, ENGLAND, ASSIGNOR TO THE BRISTOL AEROPLANE COMPANY, LIMITED, OF BRISTOL, ENGLAND, A BRITISH COMPANY.

CONSTRUCTION OF JOINT COMPRISING MEMBERS OF DIFFERENT THERMAL EXPANSIONS.

Application filed September 30, 1925. Serial No. 59,646.

*To all whom it may concern:*

Be it known that I, ALFRED HUBERT ROY FEDDEN, British subject, residing at Bristol, in the county of Gloucester, England, have invented a certain new Improved Construction of Joint Comprising Members of Different Thermal Expansions, of which the following is a specification.

This invention has for its object to provide an improved construction for jointing members together when the clamping-member or its equivalent has a coefficient of thermal expansion different from that of the member which it holds; it may be used, for example, for fastening an aluminium cylinder-head by means of steel bolts to the cylinder.

According to this invention there is provided in a structure which is to be subjected to temperature variations, the combination with a part which, although liable to thermal expansion, is required to be tightly held at all times between an abutment and a clamping device secured thereto, which clamping device has a coefficient of thermal expansion different from that of the said part, of a third element which constitutes a part of the effective length of the clamp and is selected as to its dimensions and coefficient of thermal expansion relatively to the dimensions and coefficients of said part and clamp, so that the relative movement of the clamping faces with change of temperature is substantially equal to the expansion of the said part that they grip.

A particular application of this invention resides in its use in internal-combustion engines, in which a cylinder-head of aluminium or other material having a high coefficient of thermal expansion is required to be secured to a cylinder by bolts of steel which have a much lower coefficient of thermal expansion. The use of aluminium or an alloy thereof for the cylinder-head offers some special advantages, but this head has to be secured by means of steel bolts to the cylinder, and since the coefficient of thermal expansion of aluminium is about twice that of steel, it has not hitherto been possible to ensure that the joint between the cylinder-head and the cylinder can be kept tight.

The accompanying drawing is a sectional view showing the application of this invention to an internal-combustion engine cylinder-head.

The cylinder barrel, indicated by the reference 10, is in this construction made of steel, and it is provided near one end with a circumferential radial flange 11. This flange may be extended in the form of a cooling-fin in the case of an air-cooled cylinder. The cylinder-hood 12, which is made of aluminium or some alloy thereof, is arranged to enclose the end 13 of the cylinder barrel 10, and is provided with a flat end-face 14 whereby it is seated on the flange 11. This flange 11 and the cylinder-head itself are bored to receive steel holding-down bolts 15; these bolts are made of a greater length than the combined thicknesses of that part of the head 12 through which they pass and the plane 11, so that a portion projects at the upper end, as shown at 16. A packing-piece 17 is interposed between the hand 18 of the bolt and the upper face 19 of the cylinder-head, so that a nut 20 screwed on to the bolt on the under side of the cylinder-flange 11 can draw the various parts tightly together. This packing-piece 17, which takes the form of a sleeve, is made of any suitable material which has a low coefficient of thermal expansion; it may be, for example, a nickel-steel having a high percentage of nickel, materials of this type being available in which the coefficient of thermal expansion is of the order of only one-fifth of that of the steel used for the bolts 15.

It will be seen that the aluminium cylinder-head is gripped at the faces 14, 19 between the cylinder flange 11 and the end of the sleeve 17, the other end of this sleeve abutting the head 18 of the bolt 15. When this joint is subjected to an increase of temperature, the expansion of the aluminium (which has a greater coefficient than that of the bolt) is accommodated owing to the greater length of the bolt which is available for expansion with a smaller coefficient. The packing-piece 17 having a very small or negligible coefficient of expansion does not subtract materially from the expansion of the full length of the bolt. In other words, the sum of the expansions of the aluminium and the sleeve 17 can be made equal to the expansion of the bolt 15.

In the particular construction illustrated, the bolt 15 happens to be longer than the other bolts which are used for retaining the cylinder-head in place, but this construction may be applied to any of them. Also, it is not necessary that the bolt should be of much greater length than the thickness of the aluminium part which it grips, since the sleeve 17 might be accommodated within an enlargement of the bolt-hole in the aluminium if so desired; in this case, the expansion of the aluminium which has to be accommodated would be only the expansion of that part between the bottom of the enlargement of the bolt-hole and the opposite face which abuts the cylinder-flange.

It will be seen that by suitably selecting the length of the bolt and packing-piece in relation to the thickness of the aluminium part which it is to grip, and in relation to the coefficients of expansion of the aluminium, steel bolt and packing-piece, any desired degree of compensation for thermal expansion can be obtained.

It is not essential that complete compensation for the differences of expansion should always be realized, for the elastic properties of the metals concerned may be utilized in order to ensure a tight joint at all times; it is only necessary to provide that the materials are not permanently deformed by the stresses to which they are submitted with change of temperature, and this invention therefore comprises constructions as hereinbefore described in which the amount of compensation provided is sufficient only to ensure that the differences in length to be accommodated are within the elastic properties of the materials.

In the particular construction described, an aluminium cylinder-head has been secured to a steel cylinder, but it will be appreciated that the material of the cylinder is of no consequence from the point of view of the present invention which is concerned only with the materials of the cylinder-head and its holding-down bolt, or in other words, the part which is to be clamped and the clamping means. When the steel cylinder and aluminium cylinder-head are used, there will be a difference in their expansions measured diametrically of the cylinder, but this is accommodated if need be, by relative movement of the flat abutting surfaces at 14. This expansion does not introduce any risk of breaking the joint, since these two flat surfaces are held in close contact with one another by the bolt.

It is to be understood that this invention is not limited to the securing of cylinder-heads in internal-combustion engines, for it may be applied in various other circumstances where similar conditions are encountered.

What I claim as my invention and desire to secure by Letters Patent is:—

1. In a structure which is to be subjected to temperature variations, the combination with a part which, although liable to thermal expansion, is required to be tightly held at all times between an abutment and a clamping-device secured thereto, which clamping-device has a coefficient of thermal expansion different from that of the said part, of a third element which constitutes a part of the effective length of the clamp and is selected as to its dimensions and coefficient of thermal expansion relatively to the dimensions and coefficients of the said part and clamp, so that the relative movement of the clamping faces with change of temperature is substantially equal to the expansion of the said part that they grip.

2. In an internal-combustion engine, the combination with a cylinder and an aluminium or aluminium alloy cylinder-head, of steel bolts for securing the head to the cylinder, which bolts are longer than the thickness of the head which they grip, and are provided with packing-pieces having a coefficient of thermal expansion less than that of the steel, to compensate for the difference in expansion of the steel and aluminium.

3. The combination with a cylinder and a cylinder-head having bolts of a coefficient of thermal expansion less than that of the said cylinder-head for securing the head to the cylinder of a packing piece on each bolt having a coefficient of thermal expansion less than that of the bolt to compensate for the difference in expansion of the bolts and the cylinder-head, substantially as set forth.

4. The combination with a cylinder and a cylinder-head having bolts of a coefficient of thermal expansion less than that of the said cylinder-head for securing the head to the cylinder of a packing sleeve surrounding each bolt and abutting at one end on the cylinder-head and at the other end on an abutment on the bolt, said packing sleeves having a coefficient of thermal expansion less than that of the bolts to compensate for the difference in expansion of the bolts and the cylinder-head, substantially as set forth.

5. A construction according to claim 1 wherein the amount of compensation provided is sufficient only to ensure that the differences in length to be accommodated are within the elasticity of the materials.

In testimony whereof I affix my signature.

ALFRED HUBERT ROY FEDDEN.